United States Patent [19]

Shultz

[11] Patent Number: 4,884,914
[45] Date of Patent: Dec. 5, 1989

[54] ADJUSTABLE AND LOCKABLE SCREW SPINDLE SUPPORT DEVICE

[76] Inventor: William E. Shultz, 239 N. Main St., Lombard, Ill. 60148

[21] Appl. No.: 198,187

[22] Filed: May 23, 1988

[51] Int. Cl.[4] ............................................. F16B 7/18
[52] U.S. Cl. .................................... 403/118; 403/343; 403/324; 248/354.4
[58] Field of Search ............... 403/347, 324, 118, 106, 403/107, 67, 59, 343; 248/354.4, 354.3, 413

[56] References Cited

U.S. PATENT DOCUMENTS

| | | | |
|---|---|---|---|
| 2,532,173 | 11/1950 | Lewis | 248/413 |
| 2,644,504 | 7/1953 | Vick | 403/107 |
| 2,664,305 | 12/1953 | Hobart | 403/67 |
| 3,603,552 | 9/1971 | Wheelock | 248/354.3 X |
| 3,856,421 | 12/1974 | Nogler | 248/354.3 X |

Primary Examiner—Andrew V. Kundrat
Attorney, Agent, or Firm—Mason, Kolehmainen, Rathburn & Wyss

[57] ABSTRACT

A support device for supporting a longitudinal member, such as a threaded rod, in a desired position with respect to the support device includes a housing adapted to receive the threaded rod, transversely within a housing aperture, and a slide axle, slideably received axially within the housing. The slide axle receives the threaded rod and is slidable within the housing to (1) a first position frictionally engaging the rod and (2) a second position disengaged from the rod so that the rod can be relatively freely moved with respect to the slide axle. The rod supporting device includes a tightening member or lock nut to secure the slide axle in a locked position whereby the rod is tightly held against a housing bearing wall defining a portion of the housing aperture. The housing bearing wall is relatively smooth so that the threaded rod is tightly held in locked position by the lock nut, while minimizing axial movement of the rod with respect to the housing.

28 Claims, 3 Drawing Sheets

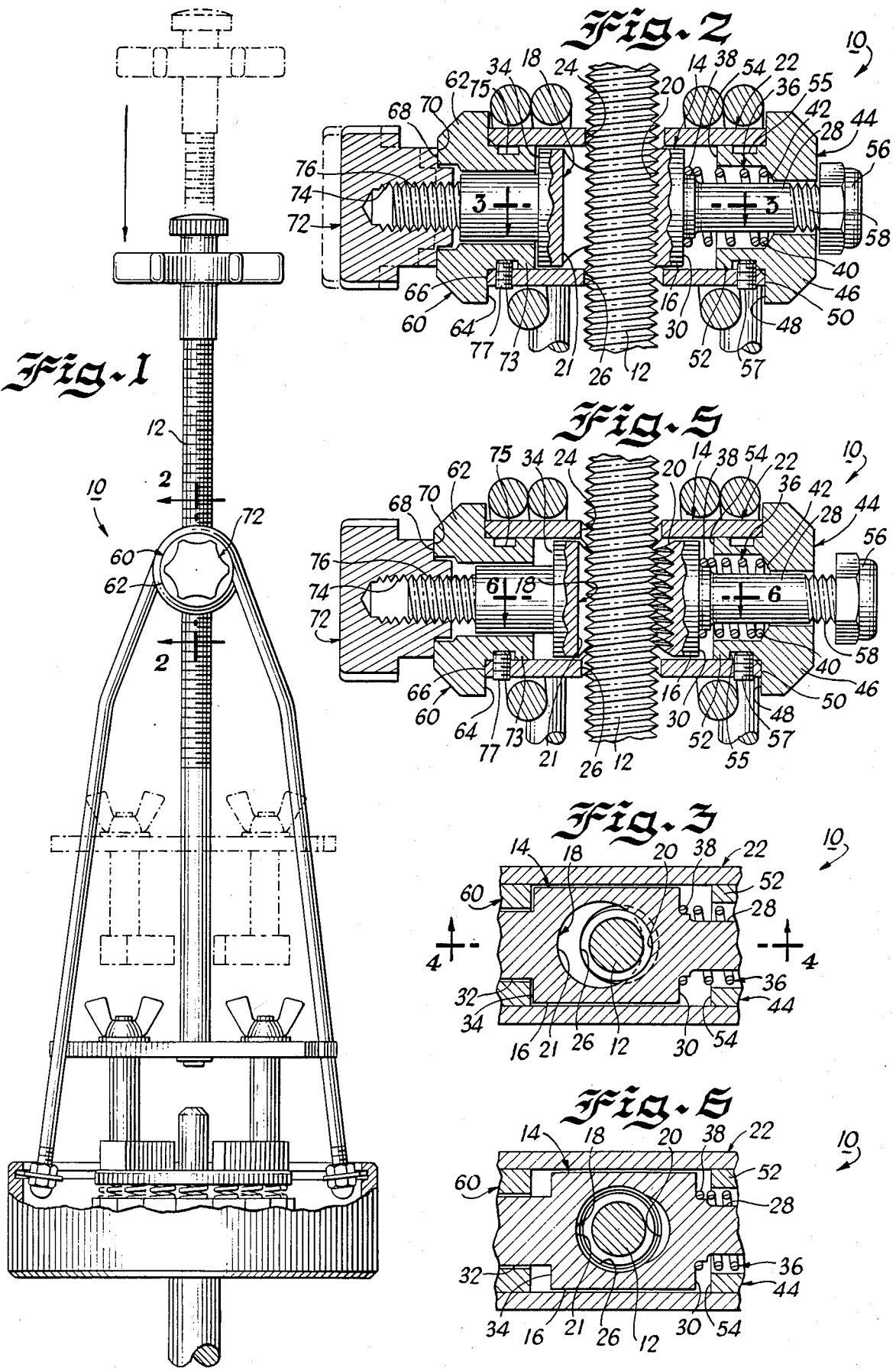

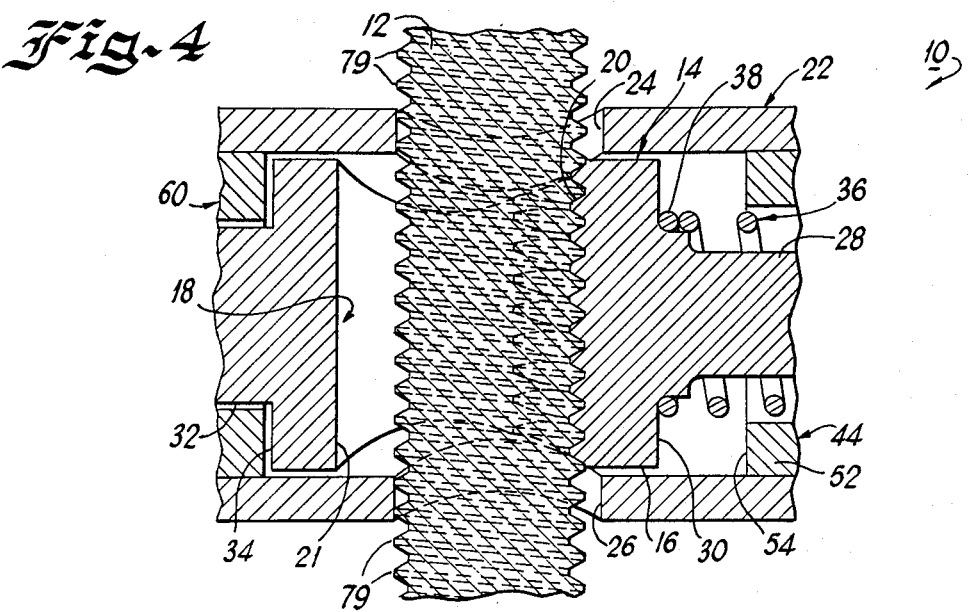
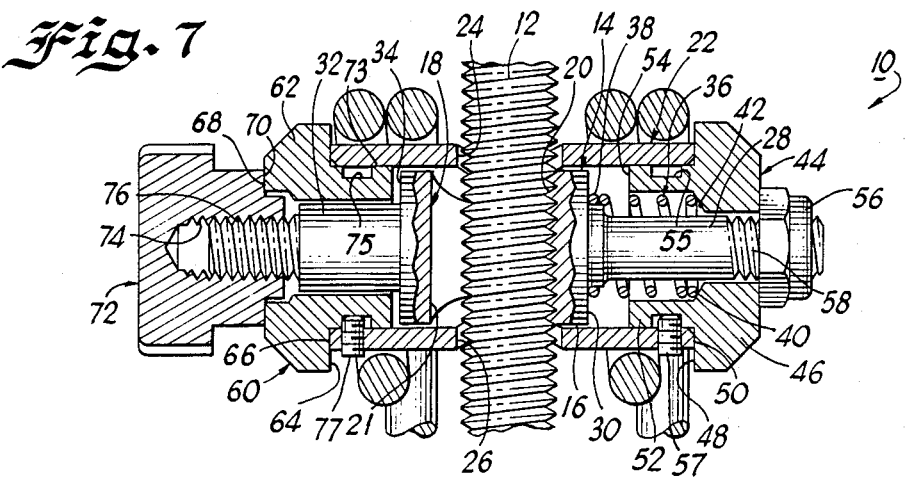
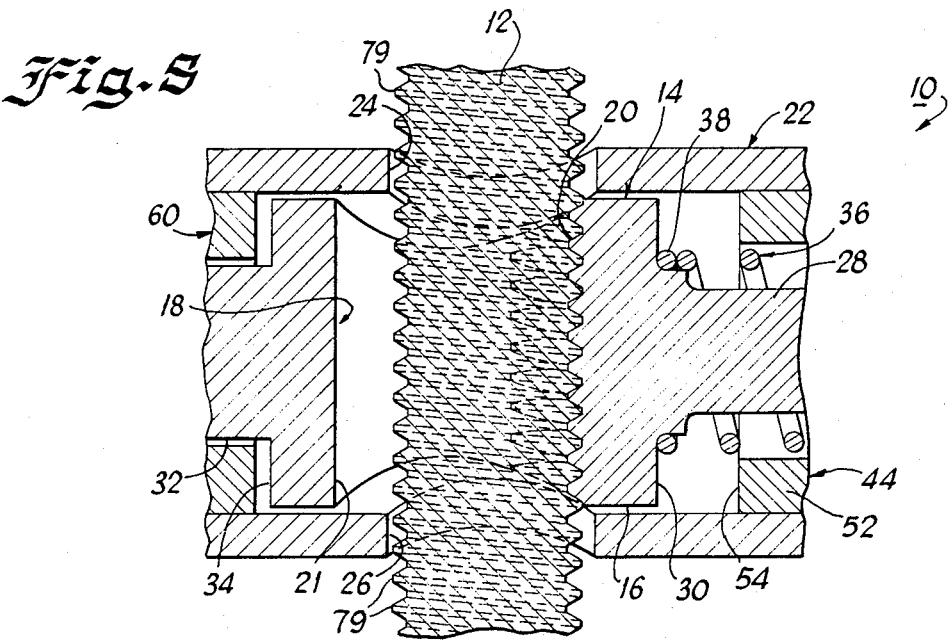

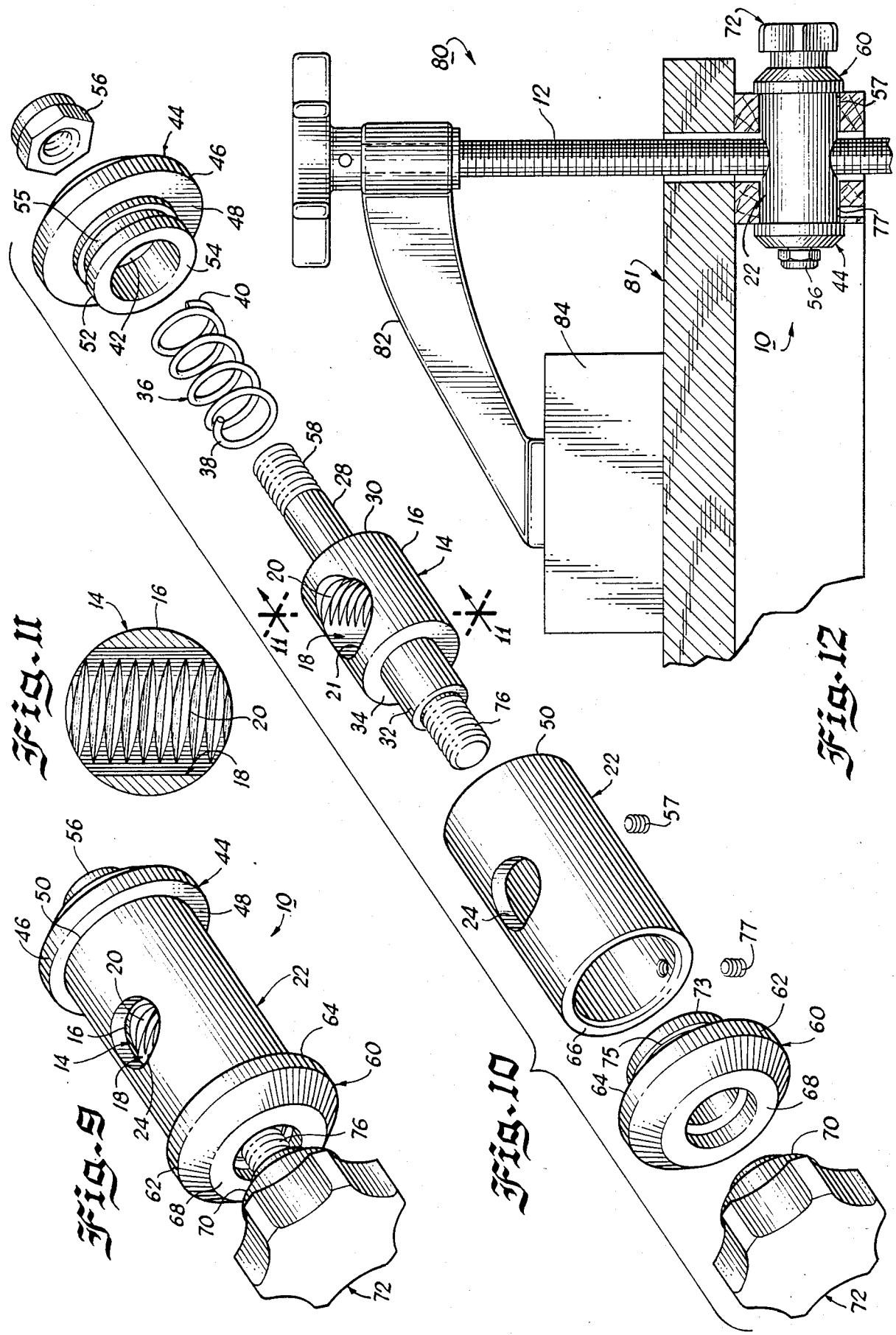

ADJUSTABLE AND LOCKABLE SCREW SPINDLE SUPPORT DEVICE

FIELD OF THE INVENTION

The present invention is directed to an adjustable and lockable screw spindle support device wherein a screw spindle or threaded rod is longitudinally movable quickly, without rotating the rod with respect to the support device in one mode; is movable slowly by rotating the rod with respect to the support device in a second mode; and wherein the threaded rod or screw spindle is locked into position with respect to the support device in a third mode so that it is neither quickly nor threadedly movable with respect to the support device.

BACKGROUND OF THE INVENTION AND PRIOR ART

Various devices have been invented whereby a screw spindle or threaded support rod is held within a support device telescopically so that the threaded rod or screw spindle is adjustable with respect to the support device quickly by disengaging a threaded interconnection between threads of the rod and threads of the rod-receiving support device; or in a second mode where the threads of the rod are engaged by a threaded "locking" device so that the rod is moved with respect to the support device only by turning the rod for threaded longitudinal movement. Examples of such prior art support mechanisms are found in the Wheelock U.S. Pat. No. 3,603,552 and the Nogler U.S. Pat. No. 3,856,421. In either of these prior art support devices, the locking mechanism is achieved by engagement of the threaded rod with a threaded support device housing portion on one side of the threaded rod and by a movable threaded "locking" member for engagement or disengagement of the rod threads on an opposite side o the threaded rod. The two modes of operation, therefore, permit rapid longitudinal movement of the threaded rod with respect to the support device without rod turning with respect to the support device or permit movement of the threaded rod with respect to the support device when in the locked position only by turning the threaded rod.

A significant problem inherent in support devices such as those disclosed in the above two identified prior art patents is particularly critical in support devices used in the precise machining of workpieces and in machine tools used for intricate manipulations of workpieces that is, vibration of the machinery sometimes causes slight turning of the threaded rod or screw spindle even when the support device is in the "locked" position. The threaded rod support device of the present invention overcomes this problem in the prior art by providing means for engaging one side of the threaded rod against one or more flat, unthreaded, bearing surfaces to prevent any possible unintended longitudinal movement of the threaded rod or spindle with respect to the support device when the device is in a locked mode.

SUMMARY OF THE INVENTION

In brief, the present invention is directed to a support device for supporting a longitudinal member, such as a threaded rod, in a desired position with respect to the support device. The support device includes a housing adapted to receive the threaded rod, transversely within a housing aperture, and a slide axle, slideably received axially within the housing. The slide axle receives the threaded rod and is slidable within the housing to (1) a first position frictionally engaging the rod and (2) a second position disengaged from the rod so that the rod can be relatively freely moved with respect to the slide axle. To achieve the full advantage of the present invention, the rod supporting device includes a tightening member or lock nut to secure the slide axle in a locked position whereby the rod is tightly held against a housing bearing wall defining a portion of the housing aperture. To achieve the fullest advantage of the present invention, the housing bearing wall is relatively smooth so that the threaded rod is tightly held in locked position by the lock nut, while minimizing axial movement of the rod with respect to the housing.

In one embodiment, the device of the present invention is a threaded rod supporting device for receiving a threaded rod and supporting the rod in a desired position longitudinally with respect to the support device. In this embodiment, the support device includes a housing having an aperture adapted to receive the threaded rod, wherein the housing aperture has a relatively smooth wall defining one edge of the housing aperture. The smooth wall of the housing aperture is adapted to engage some of the threads on the threaded rod when the device is in a locked position. The device further includes a slide axle movable longitudinally within the housing such that by moving the slide axle in a direction toward the relatively smooth housing aperture bearing wall, the threaded rod is movable into and out of engagement with the housing aperture wall to lock and unlock the threaded rod with respect to the housing. A slide axle engaging knob is operatively connected to the slide axle axially within the housing for engagement and disengagement of the threaded rod with the housing aperture bearing wall.

The device of the present invention includes a tubular housing adapted to receive a longitudinal member transversely through the housing and adapted to receive an axially movable slide axle longitudinally within the housing. The slide axle is disposed within the housing for receiving the longitudinal member, and is axially slideable within the housing to a first position frictionally engaging the longitudinal member, and axially slideable within the housing to a second position disengaged from the longitudinal member so that the longitudinal member can be relatively freely moved axially with respect to the slide axle means. A tightening nut or other slide axle engaging means for forcing the slide axle axially to pinch the longitudinal member against the housing when the slide axle is disposed in the first position, minimizes movement of the longitudinal member with respect to said housing.

Accordingly, an object of the present invention is to provide a rod supporting device for supporting a rod or other elongated longitudinal member in a desired disposition with respect to the support device.

Another object of the present invention is to provide a threaded rod supporting device for receiving and supporting a threaded rod, including a housing containing a slide axle received within the housing and longitudinally movable within the housing. A threaded rod received completely through the housing can be pinched between a housing bearing wall and a slide axle bearing wall to secure the rod with respect to the support device; or the slide axle can be moved axially within the housing to disengage the rod for quick movement of the rod with respect to the support device.

Still another object of the present invention is to provide a threaded rod supporting device capable of tightening the rod against a support device housing wall such that in a first mode, the threaded rod can be moved with respect to the support device by turning the threaded rod with respect to the support device; in a second mode, the threaded rod can be manually disengaged from the support device for quick movement of the rod without threaded or turning movement of the rod with respect to the support device; and in a third mode, the rod is locked against the support device so that disengagement of a locking member is necessary before the rod can be manually moved at all with respect to the support device.

The above and other objects of the present invention will become apparent in accordance with the following drawings, describing a preferred embodiment of the present invention.

BRIEF DESCRIPTION OF THE DRAWINGS

FIG. 1 is a partially broken away perspective view of the apparatus of the present invention used in a transmission tool, such as that shown in U.S. Pat. No. 4,031,603;

FIG. 2 is a partially elevated, cross-sectional view of the device of the present invention taken along the line 2—2 of FIG. 1;

FIG. 3 is a partially broken away cross-sectional view taken along the line 3—3 of FIG. 2;

FIG. 4 is a partially broken away, enlarged cross-sectional view taken long the line 4—4 of FIG. 3;

FIG. 5 is a partially elevated, cross-sectional view similar to that of FIG. 2 showing the device in a position so that a threaded stem can move freely within the device of the present invention;

FIG. 6 is a cross-sectional view of the apparatus of FIG. 4 taken along the line 6—6 of FIG. 6;

FIG. 7 is a partially elevated, cross-sectional view, similar to that of FIGS. 2 and 5 showing the device in a position such that movement of the threaded stem can be accomplished only by threaded movement of the threaded stem with respect to the device;

FIG. 8 is a partially broken away, enlarged, cross-sectional view, similar to that of FIG. 4, showing the device in the position of FIG. 7;

FIG. 9 is an elevated, perspective view of the device of the present invention;

FIG. 10 is an exploded perspective view of the device shown in FIG. 9;

FIG. 11 is a cross-sectional view of a portion of the device of FIG. 7 taken along the line 11—11 of FIG. 10; and FIG. 12 is a partially broken away, perspective view of the apparatus of the present invention used in a different environment bench fold-down clamp for holding a workpiece in a secure position.

DETAILED DESCRIPTION OF THE PREFERRED EMBODIMENTS

Turning now to the drawing, and initially to FIGS. 9 and 10, there is shown an adjustable clamp or support device, generally designated 10 for securely grasping, holding or supporting a threaded spindle, rod or pole 12, therein. The threaded spindle, or pole 12, can be adjusted transversely with respect to a longitudinal axis of the clamp or support device 10 threadedly by rotation with respect to the support device 10, or by a quick adjustment mechanism, as will be described in more detail hereinafter. As best shown in FIG. 10, the clamp or support device 10 generally includes an interior, elongated slide device or slide axle, generally designated 14, generally including an enlarged central slide axle portion 16 having a centrally disposed, generally round aperture 18 defined therein tranverse to a longitudinal axis of the slide axle 14. The generally round aperture 18 is threaded at a bearing wall 20 along one edge of the aperture 18 to widen or enlarge the generally round aperture 18, as shown in FIGS. 3 and 6, and to provide threads at one longitudinal edge, as best shown in FIGS. 10 and 11, along the entire transverse length of the aperture 18, while leaving the remainder of the aperture 18 unthreaded. The aperture 18, together with the widened threads at the bearing wall 20, is large enough such that the threaded rod or spindle 12 is capable of sliding freely up and down through the aperture 18. The one threaded edge of aperture 18, forming the slide axle bearing wall 20 of the aperture 18 is threaded to receive complementarily formed threads on the threaded spindle or rod 12. The remainder of the aperture 18 in slide axle 14 forms an unthreaded, non-bearing wall 21. The slide axle device generally designated 14 fits freely and slideably within an exterior annular tubular housing, generally designated 22. The housing 22 includes upper and lower apertures 24 and 26 in axial alignment with the aperture 18 within the slide axle 14 when the slide axle is disposed within the annular housing 22 in position to permit rapid movement of the threaded rod 12 with respect to the support device 10, as shown in FIG. 5.

The slide axle 14 includes a first threaded axle end portion 28 integrally extending axially from one flat edge or wall 30 of the enlarged central slide axle portion 16 and a second threaded axle end portion 32 integrally extending axially in an opposite direction from an opposite flat edge or wall 34 of the central slide axle portion 16. A coil spring 36 is disposed over the threaded axle end portion 28 so that an inner end 38 of the coil spring is disposed against the flat edge 30 of the enlarged central slide axle portion 16 of slide axle 14 and an opposite spring end 40 is disposed against an inner surface 42 of a slide axle biasing member, or end cap member, generally designated by reference numeral 44. The slide axle biasing member 44 includes an outwardly extending peripheral flange 46 having an inner, annular flat edge or wall portion 48 for contact against an annular end edge or wall 50 of the tubular housing 22 for containing the slide axle 14 within the housing 22. The slide axle biasing member 44 includes an integral, inwardly extending, tubular portion 52 extending inwardly from the flat wall 48 to provide an innermost wall 54. Tubular portion 52 includes an annular recess 55 to receive a set screw 57 to secure the biasing member or end cap 44 to the housing 22. If the flat edge 30 of the enlarged central slide axle portion 16 of the slide axle 14 makes contact against the stop wall 54 of the slide axle biasing member 44, no further axial movement of the slide axle 14 would be possible. However, limited enlargement of the aperture 18 with respect to the threaded rod 12, will prevent contact of flat edge 30 of the enlarged central slide axle portion 16 against the stop wall 54, since the threaded rod 12 will first contact the housing 22 at apertures 24 and 26. Self-locking adjustment nut 56 secures the slide axle biasing member 44 and the coil spring 36 over the threaded axle end portion 28 by locking onto a threaded end portion 58 of the integral, reduced diameter threaded axle end portion 28 extending outwardly from the housing 22.

A cap member generally designated 60, capable of easily sliding over threaded axle end portion 32, is connected on the opposite side of the tubular housing 22 to the second threaded axle end portion 32 axially extending from the enlarged central slide axle portion 16 of the slide axle 14, and extending outwardly from the housing 22. The cap member 60 preferably has the same shape as the slide axle biasing member or end cap member 44. End cap member 60 includes an outwardly extending flange portion 62 defining an inner annular, flat edge or wall portion 64 for contact against a second end edge or wall 66 of the tubular housing 22 for containing the slide axle 14 within the housing 22. End cap member 60 also includes an opposite flat end wall 68 for engagement against an inner surface 70 of a tightening knob, generally designated 72, as will be described in more detail hereinafter. The end cap member 60 includes an inwardly extending, tubular portion 73, extending inwardly from the flat end wall 68, having an annular groove 75 adapted to receive set screw 77 for securing the end cap member 60 to the housing 22. The tightening knob 72 includes an interior threaded aperture 74 for threaded engagement with a threaded end portion 76 of the second threaded axle end portion 32, as best shown in FIGS. 2, 5 and 9.

In accordance with this construction, and as best seen in FIGS. 2 and 5, the slide axle 14 is capable of axial movement within the tubular housing 22 in either axial direction—toward the tightening knob 72, or toward the self-locking adjustment nut 56. As shown in FIG. 2, the device has been set in a locked mode, such that the coil spring 36 forces the single threaded edge of the spindle-receiving aperture 18 of slide axle 14 into engagement with the threads on one edge of the rod or spindle 12, while forcing an opposite threaded edge of the rod or spindle 12 against the unthreaded upper and lower apertures 24 and 26 in the tubular housing 22. In accordance with an important feature of the support device of the present invention, this threaded engagement of the slide axle 14 against the threaded rod 12, while forcing the opposite flattened end edges or crests 79 (FIG. 4) of the threaded rod 12 against the unthreaded, axially aligned metal edges 24 and 26 of the tubular housing 22, securely holds the rod 12 in position within the clamp or support device 10.

While held in this manner, as shown in FIG. 2, the tightening knob 72 can be in a locked position, as shown in solid lines in FIG. 2, or can be in a releasable position as shown in dashed lines in FIG. 2. This position of the knob 72, shown in dashed lines is called a releaseable position, as shown in FIG. 2, because if the housing 22 or the end cap 60 or the biasing member 44 is manually grasped and the tightening knob 72 is pushed axially inwardly toward the rod or spindle 12 from the position shown in dashed lines in FIG. 2, the slide axle 14 will be forced axially toward the end cap 44, against the spring biasing force of the coil spring 36, to disengage the threaded bearing wall 20 of the slide axle housing aperture 18 away from engagement with the threaded rod or spindle 12. This allows the clamp or support device 10 to be freely slid upwardly and downwardly about the rod or spindle 12 without the necessity of having to turn the rod or spindle 12 or the support device 10, one with respect to the other.

With the tightening knob 72 in the position shown in solid lines in FIG. 2, and with the lock nut 56, as shown in FIG. 2, however, this longitudinal movement of the slide device within the housing is impossible and the adjustable clamp or support device 10 is locked in position with respect to the rod or spindle 12. In this position, the clamp or support device 10 cannot even be turned by hand with respect to the rod or spindle 12 for a change in position of the rod or spindle 12. The tightening knob 72, when tightened firmly against the end edge 68 of the cap device 60, tightly pulls the slide axle 14 into threaded engagement with the rod or spindle 12, as shown in FIG. 2, such that the spindle 12 and the clamp or support device 10 cannot be hand turned one with respect to the other. This feature is not disclosed or suggested in prior art strut or pole supporting devices.

In accordance with another mode of the device of the present invention, when the device is in a lock mode as shown in FIG. 2, and the self-locking adjustment nut 56 is tightened further onto the threaded portion 58 of axle 28, as shown in FIG. 7, the slide axle 14 moves longitudinally to the right, as shown in FIG. 7, to loosen the threaded engagement of the threaded bearing wall 20 of the housing aperture 18 of the slide axle 14 with respect to the rod or spindle 12, such that the rod or spindle 12 can be turned with respect to the adjustable clamp or support device 10 for threaded movement of one with respect to the other, as desirable in accordance with the use of the device of the present invention.

As shown in FIG. 3, when the device of the present invention is set in a lock mode, as shown in FIG. 2, the slide axle 14 is moved as far axially left as possible (as shown in FIG. 2) or toward the end cap 60. As best shown in FIG. 6, when the support device 10 of the present invention is in a full release or quick set mode, such that the adjustable clamp or support device 10 can be freely slid upwardly and downwardly with respect to the rod or spindle 12, then the slide axle 14 has been forced axially to the right, or toward the slide device biasing member 44, to dispose the slide axle 14 such that its central round aperture 18 is in axial alignment with the upper and lower apertures 24 and 26 in the housing 22.

The apparatus can be used in a wide variety of environments wherein threaded rods or spindles 12 are supported in longitudinal position with respect to the support or clamp device 10 disclosed herein. One such environment for use of this clamp or support device 10 is shown in FIG. 1, where the support device 10 is used as a coupling member for this inventor's snap-in clutch spring device disclosed in Pat. No. 4,031,603. The adjustable clamp or support device 10 of the present invention is used in place of the coupling member described with reference to reference numeral 46 in Pat. No. 4,031,603, which patent is hereby incorporated by reference.

Another environment for use of the adjustable clamp or support device 10 of the present invention is shown in FIG. 12 where the support device 10 is shown used in conjunction with a bench hold-down clamp device, generally designated by reference numeral 80, where the support device of the present invention can be formed as an integral part of a workbench, generally designated by reference number 81. In workbench 81, the rod or spindle 12 is shown to support a workpiece hold-down clamp 82 capable of securing a workpiece 84 tightly to the workbench 81 and capable of quick adjustments upwardly and downwardly with respect to the workbench 81 in accordance with the principles of the present invention, as described. The support device 10 is attached to the workbench 81 through an access opening, not shown.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A threaded rod supporting device for receiving a threaded rod and supporting the rod in a desired position longitudinally with respect to said support device comprising:

a housing having an aperture adapted to receive the threaded rod, said aperture including a relatively smooth wall defining one edge of the housing aperture, said smooth wall adapted to engage some of the threads on the threaded rod when the device is in a locked position;

a slide member movable longitudinally within said housing such that by moving said slide means in a direction toward and away from said relatively smooth housing aperture wall said threaded rod is movable into and out of engagement with said housing aperture wall to lock and unlock said threaded rod with respect to said housing;

a threaded rod disposed within the housing aperture and within the slide member: and means for moving said slide member longitudinally within said housing for engagement and disengagement of said threaded rod with said housing aperture wall.

2. The supporting device of claim 1 further including a coil spring operatively connected to the slide means for normally biasing the slide means to force the threaded rod into engagement with said housing aperture wall.

3. The supporting device of claim 1 wherein said housing means is tubular in shape including a pair of aligned bearing walls defining a portion of an aperture extending completely through said tubular housing for receiving said threaded rod.

4. The supporting device of claim 1 wherein said slide member comprises an elongated member including a bearing wall means and a non-bearing wall means wherein the bearing wall means and the non-bearing wall means define an aperture extending completely through said slide member.

5. The supporting device of claim 4 wherein the bearing wall means of said slide member is threaded and wherein the non-bearing wall means of the slide member is not threaded, said bearing wall means of said slide member adapted to bear against complementary threads of said longitudinal member when said slide member is disposed in said first position.

6. The supporting device of claim 1 wherein said slide member comprises an elongated member having integral, opposite first and second threaded end portions extending outwardly from said housing.

7. A support device for supporting a threaded longitudinal member in a desired position with respect to said support device comprising:

housing means adapted to receive said longitudinal member transversely through said housing means and adapted to receive an axially movable slide axle longitudinal within said housing means;

slide axle means disposed within said housing means for receiving said longitudinal member, said slide axle means axially slideable within said housing means to a first position frictionally engaging said longitudinal member and axially slideable within said housing means to a second position disengaged from said longitudinal member so that said longitudinal member can be relatively freely moved with respect to said slide axle means;

a threaded longitudinal member received transversely through said housing means; and tightening means for tightening said longitudinal member against said housing means when said slide axle is disposed in said first position to minimize axial movement of said longitudinal member with respect to said housing.

8. The support device of claim 7 further including biasing means operatively connected to said slide axle means for normally biasing said slide axle in said first position.

9. The support device of claim 7 wherein said housing means is tubular in shape including a pair of aligned bearing walls forming a portion of an aperture extending completely through said tubular housing for receiving said longitudinal member.

10. The support device of claim 9 further including a pair of end cap members attached to opposite ends of said tubular housing for maintaining said slide axle means within said housing.

11. The support device of claim 7 wherein said slide axle means comprises an elongated member including a bearing wall means and a non-bearing wall means wherein the bearing wall means and the non-bearing wall means define an aperture extending completely through said slide axle means.

12. A threaded rod supporting device for receiving a threaded rod and supporting the rod in a desired position longitudinally with respect to said support device comprising:

a housing having an aperture adapted to receive the threaded rod, said aperture including relatively smooth wall defining one edge of the housing aperture, said smooth wall adapted to engage some of the threads on the threaded rod when the device is in a locked position;

a slide member including an elongated member having a threaded bearing wall means adapted to bear against complementary threads of the threaded rod when the slide member is sufficiently moved toward said housing aperture wall and an unthreaded, non-bearing wall means wherein the bearing wall means and the non-bearing wall means define an aperture extending completely through said slide member, said slide member being movable longitudinally within said housing such that by moving said slide member in a direction toward and away from said relatively smooth housing aperture wall said threaded rod is movable into and out of engagement with said housing aperture wall to lock and unlock said threaded rod with respect to said housing; and means for moving said slide member longitudinally within said housing for engagement and disengagement of said threaded rod with said housing aperture wall.

13. The supporting device of claim 12 wherein said housing means includes a bearing wall means for bearing contact against said longitudinal member when said slide member is disposed in said lock position.

14. The supporting device of claim 12 wherein the bearing wall means of said slide member is threaded and wherein the non-bearing wall means of the slide axle means is not threaded, said bearing wall means of said slide member adapted to bear against complementary threads of said longitudinal member when said slide member is sufficiently moved toward said housing aperture wall.

15. A threaded rod supporting device for receiving a threaded rod and supporting the rod in a desired position longitudinally with respect to said support device comprising:
   a housing having an aperture adapted to receive the threaded rod, said aperture including a relatively smooth wall defining one edge of the housing aperture, said smooth wall adapted to engage some of the threads on the threaded rod when the device is in a locked position;
   an elongated slide member having integral opposite first and second end portions extending outwardly from said housing, said slide being movable longitudinally within said housing such that by moving said slide member in a direction toward and away from said relatively smooth housing aperture wall said threaded rod is movable into and out of engagement with said housing aperture wall to lock and unlock said threaded rod with respect to said housing; and
   means for moving said slide member longitudinally within said housing for engagement and disengagement of said threaded rod with said housing aperture wall.

16. The supporting device of claim 15 including a threaded nut threadedly interconnected to said first threaded end portion of said slide member for securely tightening the slide member for engagement of the threaded rod against the housing.

17. The supporting device of claim 15 further including a threaded knob threadedly interconnected to said second threaded end portion of said slide member for manually moving said slide member into a position to unlock the threaded rod with respect to the housing so that the slide member can be manually axially moved to disengage the slide member from the threaded rod.

18. The support device of claim 17 wherein the threaded knob is capable or being threaded received by said second threaded end portion of said slide member to a position whereby the slide member is tightly secured in a position pinching the threaded rod against the housing and wherein the slide member cannot be manually moved without first threadedly moving the knob with respect to said second threaded end portion of the slide member.

19. A support device for supporting a longitudinal member in a desired position with respect to said support device comprising:
   housing means adapted to receive said longitudinal member transversely through said housing means and adapted to receive an axially movable slide axle longitudinally within said housing means;
   slide axle means disposed within said housing means for receiving said longitudinal member, said slide axle means axially slideable within said housing means to a first position frictionally engaging said longitudinal member and axially slideable within said housing means to a second position disengaged from said longitudinal member so that said longitudinal member can be relatively freely moved with respect to said slide axle means;
   biasing means operatively connected to said slide axle means for normally biasing said slide axle in said first position; and
   tightening means for tightening said longitudinal member against said housing means when said slide axle is disposed in said first position to minimize axial movement of said longitudinal member with respect to said housing.

20. A support device for supporting a longitudinal member in a desired position with respect to said support device comprising:
   housing means adapted to receive said longitudinal member transversely through said housing means and adapted to receive an axially movable slide axle longitudinally within said housing means;
   a pair of end cap members attached to opposite ends of said tubular housing for maintaining said slide axle means within said housing;
   slide axle means disposed within said housing means for receiving said longitudinal member, said slide axle means axially slideable within said housing means to a first position frictionally engaging said longitudinal member and axially slideable within said housing means to a second position disengaged from said longitudinal member so that said longitudinal member can be relatively freely moved with respect to said slide axle means; and
   tightening means for tightening said longitudinal member against said housing means when said slide axle is disposed in said first position to minimize axial movement of said longitudinal member with respect to said housing.

21. A support device for supporting a longitudinal member in a desired position with respect to said support device comprising:
   housing means adapted to receive said longitudinal member transversely through said housing means and adapted to receive an axially movable slide axle longitudinally within said housing means;
   slide axle means disposed within said housing means for receiving said longitudinal member, said slide axle means axially slideable within said housing means to a first position frictionally engaging said longitudinal member and axially slideable within said housing means to a second position disengaged from said longitudinal member so that said longitudinal member can be relatively freely moved with respect to said slide axle means, wherein said slide axle means comprises an elongated member including a bearing wall means and a non-bearing wall means wherein the bearing wall means and the non-bearing wall means define an aperture extending completely through said slide axle means; and
   tightening means for tightening said longitudinal member against said housing means when said slide axle is disposed in said first position to minimize axial movement of said longitudinal member with respect to said housing;
   the bearing wall means of said slide axle means is threaded and wherein the non-bearing wall means of the slide axle means is not threaded, said bearing wall means of said slide axle means adapted to bear against complementary threads of said longitudinal member when said slide axle is disposed in said first position.

22. The support device of claim 21 wherein said housing means includes a bearing wall means for bearing contact against said longitudinal member when said slide axle is disposed in said first position.

23. A support device for supporting a longitudinal member in a desired position with respect to said support device comprising:
  housing means adapted to receive said longitudinal member transversely through said housing means and adapted to receive an axially movable slide axle longitudinally within said housing means;
  slide axle means having integral, opposite first and second end portions extending outwardly from said housing means, said slide axle means disposed within said housing means for receiving said longitudinal member, said slide axle means axially slideable within said housing means to a first position frictionally engaging said longitudinal member and axially slideable within said housing means to a second position disengaged from said longitudinal member so that said longitudinal member can be relatively freely moved with respect to said slide axle means; and
  tightening means for tightening said longitudinal member against said housing means when said slide axle is disposed in said first position to minimize axial movement of said longitudinal member with respect to said housing.

24. The support device of claim 23 wherein said tightening means comprises a threaded nut means threadedly interconnected to said first threaded end portion of said slide axle for securely tightening said slide axle in said first position.

25. The support device of claim 23 further including a threaded knob means threadedly interconnected to said second threaded end portion of said slide axle means for manually moving said slide axle into said second position.

26. The support device of claim 25 wherein said threaded knob means is capable of being threadedly received by said second threaded end portion of said slide axle means to a position whereby the slide axle is tightly secured in said first position and said slide axle cannot be moved to said second position without first threadedly moving said knob means with respect to said second threaded end portion of said slide axle means.

27. The support device of claim 7 wherein said slide axle comprises an elongated member having integral, opposite first and second threaded end portions extending outwardly from said housing means.

28. A method of securing a longitudinal member in a set position with respect to a stationary portion of an apparatus wherein the longitudinal member is received through a slide axle capable of axial movement with respect to said stationary portion of said apparatus, said slide axle being spring biased in one axial direction with respect to said stationary portion of said apparatus, and said slide axle operatively interconnected to a manually engageable slide axle push member extending outwardly from said stationary portion of said apparatus, and adapted for manually moving the slide axle to a position whereby the slide axle engages the longitudinal member and to a position whereby the slide axle is disengaged from the longitudinal member, said slide axle also operatively interconnected to an adjustable lock member capable of locking the slide axle in position in engagement with the longitudinal member, said method comprising:
  manually adjusting the adjustable lock member to tightly engage the slide axle against said longitudinal member to lock the longitudinal member against the stationary portion of the apparatus; and
  adjusting the slide axle push member to tightly engage the stationary portion of the apparatus so that the slide axle push member is in a position such that it no longer is capable of axially moving the slide axle with respect to the stationary portion of the apparatus.

* * * * *